(12) United States Patent
Lim et al.

(10) Patent No.: US 7,953,365 B2
(45) Date of Patent: May 31, 2011

(54) APPARATUS AND METHOD FOR SELECTING A RELAY MODE IN A MULTIHOP RELAY BROADBAND WIRELESS COMMUNICATION SYSTEM

(75) Inventors: Eun-Taek Lim, Suwon-si (KR); Young-Bin Chang, Anyang-si (KR); Il-Hwan Kim, Incheon (KR); Chung-Gu Kang, Seoul (KR); Dong-Seek Park, Yongin-si (KR); Pan-Yuh Joo, Seoul (KR); Chang-Yoon Oh, Yongin-si (KR)

(73) Assignees: Samsung Electronics Co., Ltd., Suwon-si (KR); Industry-University Cooperation Foundation Sogang University, Seoul (KR)

(*) Notice: Subject to any disclaimer, the term of this patent is extended or adjusted under 35 U.S.C. 154(b) by 576 days.

(21) Appl. No.: 12/035,701

(22) Filed: Feb. 22, 2008

(65) Prior Publication Data
US 2008/0207117 A1 Aug. 28, 2008

(30) Foreign Application Priority Data
Feb. 22, 2007 (KR) .................. 10-2007-0017786

(51) Int. Cl.
*H04B 7/15* (2006.01)
(52) U.S. Cl. ....................... 455/11.1; 455/501

(58) Field of Classification Search .......... 455/7, 11.1, 455/13.1, 15, 452.1, 453, 10, 63.1
See application file for complete search history.

(56) References Cited

U.S. PATENT DOCUMENTS
2007/0165581 A1 * 7/2007 Mehta et al. ............ 370/338

OTHER PUBLICATIONS

Xinmin Deng and Alexander M. Haimovich, Power Allocation for Cooperative Relaying in Wireless Networks, IEEE Communications Letters, Nov. 2005, vol. 9, No. 11, pp. 994-996.
Deng et al., Power Allocation for Cooperative Relaying in Wireless Networks, IEEE Communication Letters, Nov. 11, 2005, vol. 9, Issue 11, pp. 994-996.

* cited by examiner

*Primary Examiner* — Tu X Nguyen
(74) *Attorney, Agent, or Firm* — Jefferson IP Law, LLP

(57) ABSTRACT

An apparatus and a method for selecting one of a plurality of relay modes in a wireless communication system are provided. The method includes checking a channel state between a Mobile Station (MS) and each of at least one Relay Station (RS), selecting the relay mode for supporting a relay service using the determined channel state between the MA and each of the at least one RS, and providing the relay service to the MS using the selected relay mode. Thus, system throughput and outage performance can be enhanced by using the appropriate relay mode based on the MS distribution or the channel condition.

23 Claims, 14 Drawing Sheets

APPARATUS AND METHOD FOR SELECTING A RELAY MODE IN A MULTIHOP RELAY BROADBAND WIRELESS COMMUNICATION SYSTEM

PRIORITY

This application claims the benefit under 35 U.S.C. §119 (a) to a Korean patent application filed in the Korean Intellectual Property Office on Feb. 22, 2008 and assigned Serial No. 2007-17786, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co. Ltd. and 2) Industry-University Cooperation Foundation Sogang University.

BACKGROUND OF THE INVENTION

1. Field of the Invention

The present invention relates to a multihop relay wireless communication system. More particularly, the present invention relates to an apparatus and a method for selectively using a relay mode based on channel states associated with relay stations in the wireless communication system.

2. Description of the Related Art

The fourth generation (4G) mobile communication system utilizes cells with a relatively small radius in order to accommodate high-speed communications and a greater amount of communications traffic. It has been determined that it is unfeasible to design the 4G communication system in a centralized manner. Hence, the 4G communication system will be implemented in a distributed manner, thereby enabling it to actively cope with an environmental change such as the addition of a new base station. That is, the 4G communication system requires a self-configurable wireless network capable of configuring a wireless network autonomously or distributively.

In implementing a self-configurable wireless network, the 4G communication system adopts a technique employed by ad-hoc networks. In particular, the 4G communication system realizes the self-configurable wireless network by applying a multihop relay mode of an ad-hoc network to a wireless network that includes a stationary base station.

Communicating through a direct link between the fixed base station and a mobile station, a typical wireless communication system can establish a radio communication link with a high degree of reliability between the mobile station and the base station. Yet, the wireless network configuration of the wireless communication system is not easily adaptable because of the fixed position of the base station. As a result, the wireless communication system is unable to provide effective services in a wireless environment when there is a significant change in the distribution of traffic or in the required amount of traffic.

To address those shortcomings, the wireless communication system can employ a relay service which delivers data via multiple hops using several mobile stations or several relay stations. The relay wireless communication system is able to reconfigure the network in reaction to the change in the communication environment and is able to operate the entire wireless network more efficiently.

The wireless communication system can provide a radio channel with a better channel state to the mobile station by installing a relay station between the base station and the mobile station and establishing a multihop relay path via the relay station. In a cell boundary area with a poor channel state from the base station, the wireless communication system can offer a high-speed data channel and the extended cell service coverage area by using the multihop relay mode via the relay station to provide service.

FIG. 1 depicts a conventional multihop relay wireless communication system.

Mobile Stations (MSs) 140 through 170 in the multihop relay wireless communication system of FIG. 1 can use a broadband wireless access service from a Base Station (BS) 100 and Relay Stations 110, 120 and 130.

The BS 100 communications with the MSs 140 and 150 in its service coverage 101 through direct links L1. In doing so, the BS 100 can increase a transmission capacity with the MS 150, which travels in the cell boundary area or in a shadow region that is severely shielded by buildings and thus suffers from a bad channel state, through a relay link L2 and R1 using the RS2 130.

The BS 100 communicates with the MSs 160 and 170 outside its service coverage 101 through relay links L3 and RSL1 via the RS1 110. The BS 100 can extend its cell coverage area by providing the communication links to the MSs 160 and 170 outside the service coverage area using the RS1 110. In doing so, the RS1 110 can increase a transmission capacity with the MS4 170, which travels in the cell boundary area and suffers from a bad channel state, using a relay link L4, R2 and RSL1 using the RS2 120 and the RS1 110.

The wireless communication system can utilize a simple relay mode which provides the relay service to the MS via a single RS, and a cooperative relay mode which services the MS via a plurality of RSs.

Compared with the cooperative relay mode, the simple relay mode features a lower Carrier to Interference and Noise Ratio (CINR) in signals received at the MS through the relay service. In other words, the cooperative relay mode exhibits a higher CINR in the signals received at the MS when compared to the simple relay mode.

In addition, the simple relay mode has higher band efficiency than the cooperative relay mode. In other words, the band efficiency in the cooperative relay mode deteriorates more than in the simple relay mode.

As discussed above, the simple relay mode and the cooperative relay mode of the wireless communication system have different features. Therefore, the wireless communication system requires a method for selectively using the relay mode based on the channel state between the RS and the MSs.

SUMMARY OF THE INVENTION

An aspect of the present invention is to address at least the above mentioned problems and/or disadvantages and to provide at least the advantages described below. Accordingly, an aspect of the present invention is to provide an apparatus and a method for selectively using a relay mode in a multihop relay wireless communication system.

Another aspect of the present invention is to provide an apparatus and a method for selectively using a relay mode based on a channel state in a multihop relay wireless communication system.

Yet another aspect of the present invention is to provide an apparatus and a method for selectively using a simple relay mode or a cooperative relay mode based on a channel state in a multihop relay wireless communication system.

The above aspects are addressed by providing a method for selecting one of a plurality of relay modes in a wireless communication system. The method includes checking a channel state between a Mobile Station (MS) and each of at least one Relay Station (RS), selecting the relay mode for supporting a relay service using the determined channel state between the MS and each of the at least one RS, and providing the relay service to the MS using the selected relay mode.

According to one aspect of the present invention, a method for selecting one of a plurality of relay modes in a Base Station (BS) of a wireless communication system is provided. The method includes checking channel state information corresponding to a channel state between a Mobile Station (MS) and each of at least one Relay Station (RS), selecting a relay mode for supporting a relay service using the channel state information, and transmitting the selected relay mode to the MS and to each of at least one RSs which is to be used to provide the relay service.

According to yet another aspect of the present invention, a BS in a wireless communication system is provided. The BS includes a receiver for receiving signals from Relay Stations (RSs) and Mobile Stations (MSs), a channel state checker for checking channel state information between an MS and each of at least one RS in a signal received from the MS to which a relay service is to be provided, a relay mode determiner for selecting a relay mode using the channel state information, and a transmitter for transmitting the selected relay mode to the MS and to each of at least one RS which is to be used to provide the relay service.

According to still another aspect of the present invention, a method for selecting one of a plurality of relay modes in an MS of a wireless communication system is provided. The method includes checking a channel state in relation with each of at least one Relay Station (RS) using information in a corresponding signal received from each of the at least one RS, selecting the relay mode for supporting a relay service using the information, and transmitting the selected relay mode to a Base Station (BS) and to each of at least one RS which is to be used to provide the relay service.

According to further another aspect of the present invention, an MS of a wireless communication system is provided. The MS includes a receiver for receiving a signal from each of at least one Relay Station (RS), a channel state checker for checking channel state information of each of the at least one RS in the corresponding received signal, a relay mode determiner for selecting one of a plurality of relay modes using the channel state information of each of the at least one RS, and a transmitter for transmitting the selected relay mode to the BS and to each of at least one RS which is to be used to provide the relay service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for providing a relay service in a relay mode selected based on a channel state in a multihop relay wireless communication system.

Hereinafter, it is assumed that the wireless communication system provides the relay service by selecting either a simple relay mode or a cooperative relay mode based on the channel state. Herein, the simple relay mode provides the relay service to a Mobile Station (MS) via a single Relay Station (RS). The cooperative relay mode provides the relay service to the MS via a plurality of RSs.

The wireless communication system adopts a Time Division Duplex (TDD) scheme and an Orthogonal Frequency Division Multiple Access (OFDMA) scheme by way of example. Note that the present invention is applicable to other multiple access communication systems or Frequency Division Duplex (FDD) communication systems.

Figure 1:
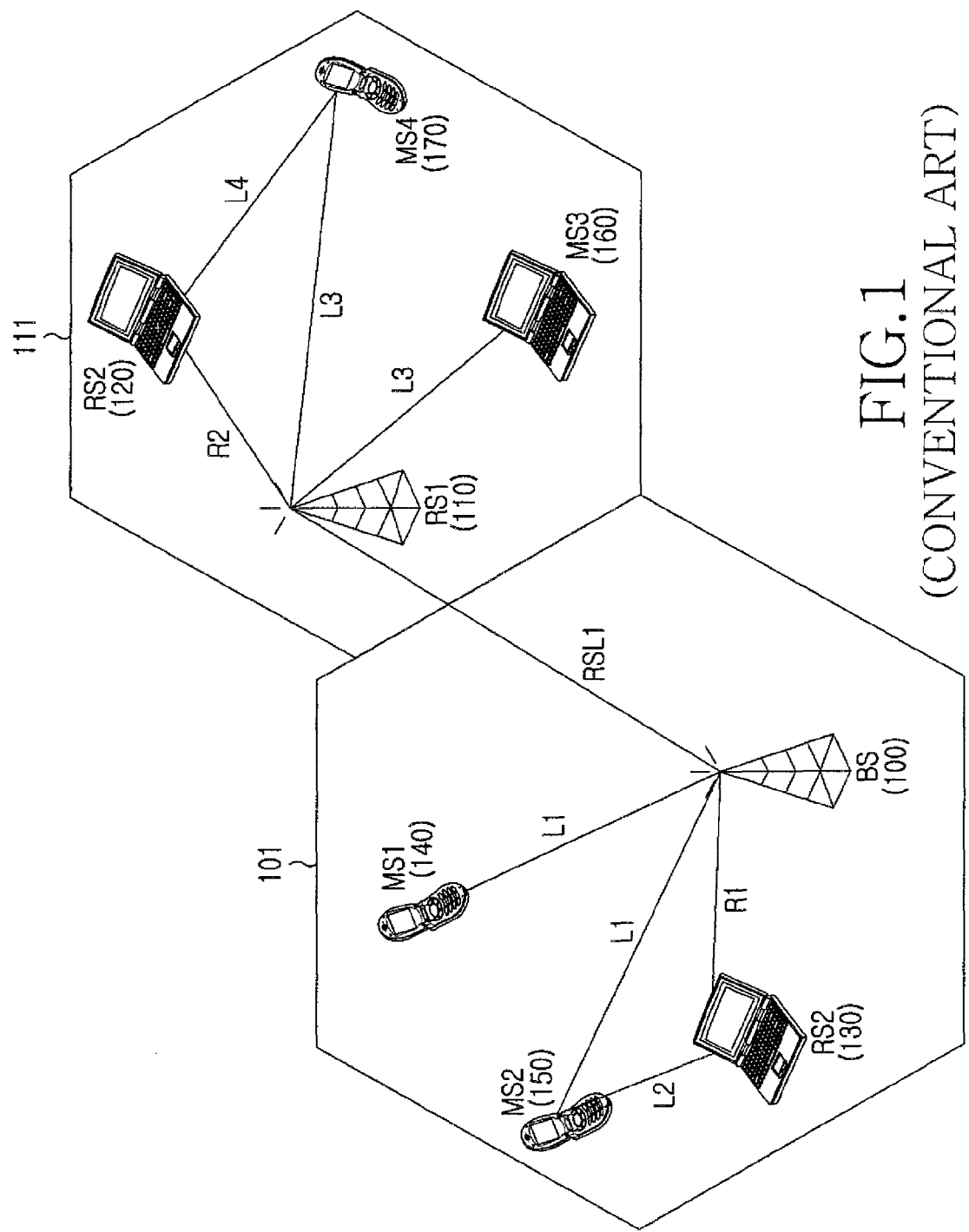
FIG. 1 illustrates a conventional multihop relay wireless communication system.
Figure 2:
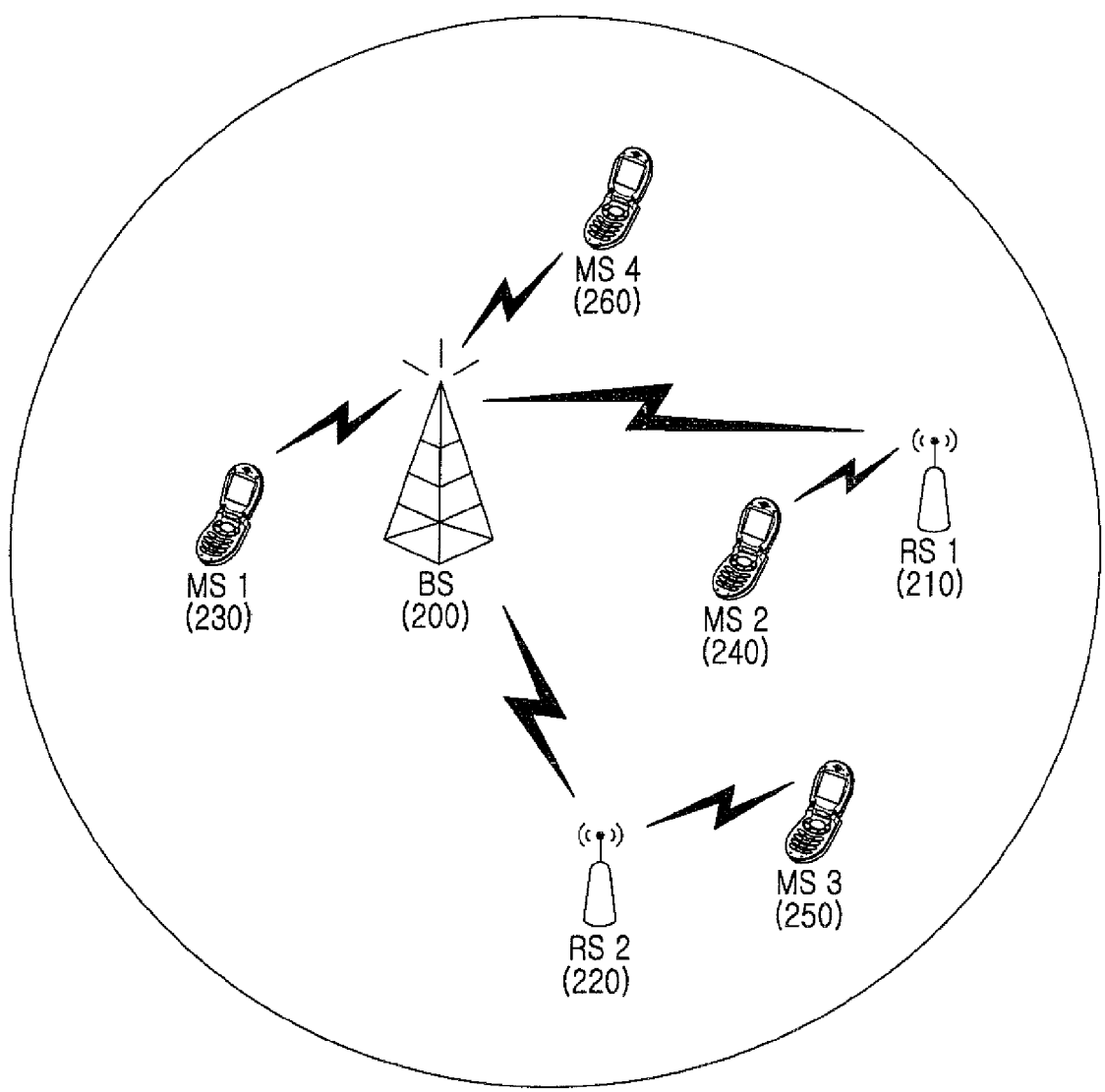
FIG. 2 illustrates a simple relay wireless communication system according to an exemplary embodiment of the present invention.

Using the simple relay mode, the wireless communication system can be constituted as shown in FIG. 2.

FIG. 2 illustrates a simple relay wireless communication system according to an exemplary embodiment of the present invention.

MSs 230 through 260 in the wireless communication system of FIG. 2 can be serviced by a Base Station (BS) 200 via RSs 210 and 220.

The MSs 230 through 260 are serviced from the BS 200 through one node that is selected based on the channel state between the BS 200 and the RSs 210 and 220. For example, the MS1 230 and the MS4 260 are serviced by the BS 200 selected according to the channel state. The MS2 240 is serviced by the RS1 210 selected based on the channel state and the MS3 250 is serviced by the RS2 220 selected based on the channel state.

Figure 3:
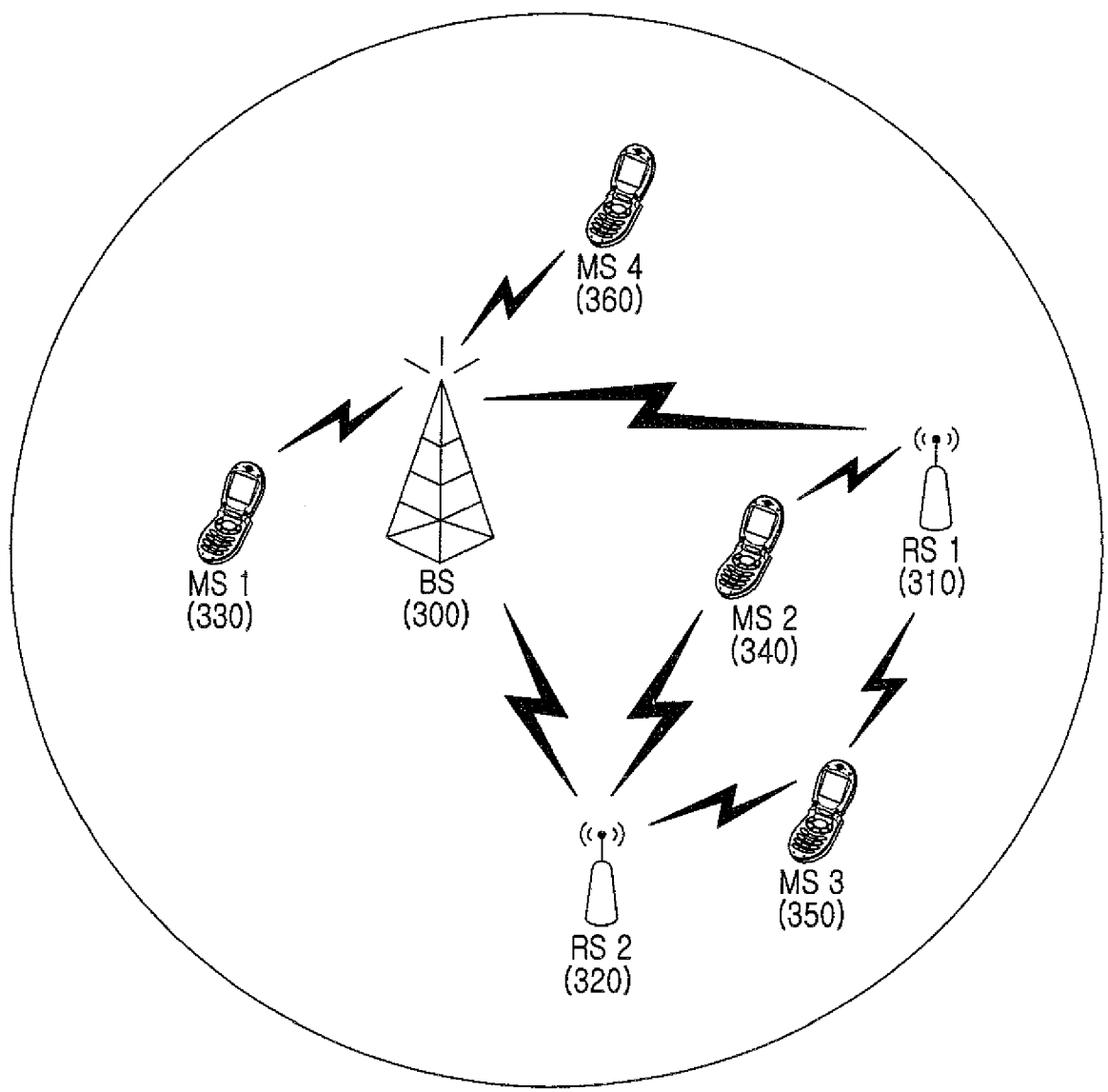
FIG. 3 illustrates a cooperative relay wireless communication system according to an exemplary embodiment of the present invention.

In the cooperative relay mode, the wireless communication system can be constituted as shown in FIG. 3.

FIG. 3 illustrates a cooperative relay wireless communication system according to an exemplary embodiment of the present invention.

MSs 330 through 360 in the wireless communication system of FIG. 3 can be serviced from a BS 300 and RSs 310 and 320.

The MSs 330 through 360 are serviced through at least one node that is selected based on the channel state of the BS 300 and the RSs 310 and 320. More specifically, the MSs 330 through 360 select multiple nodes having a channel state higher than a reference value in relation with the BS 300 and the RSs 310 and 320, and are serviced from the selected nodes.

For example, the MS1 330 and the MS4 360 are serviced by the BS 300. The MS2 340 and the MS3 350 are cooperatively serviced by the RS1 310 and the RS2 320.

Figure 4:
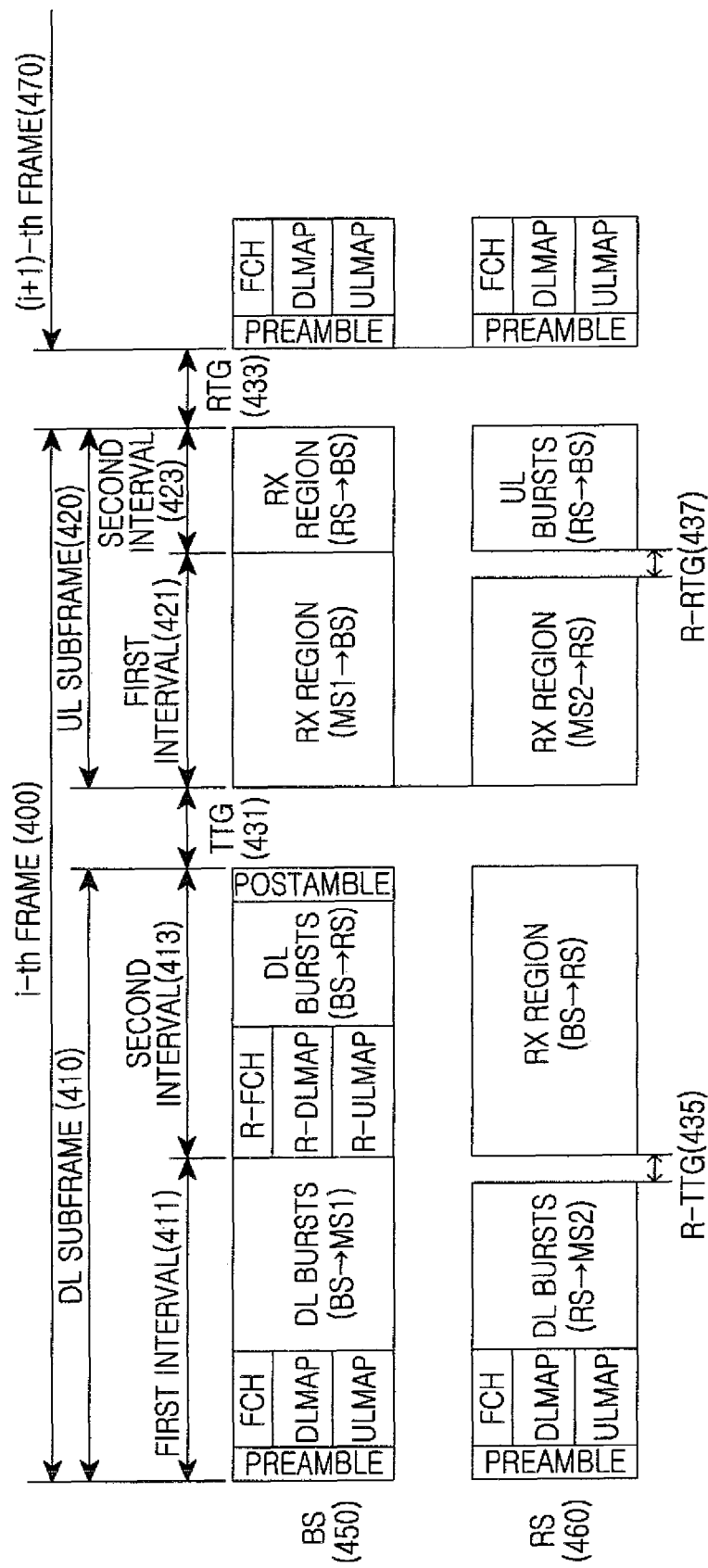
FIG. 4 illustrates a frame structure for supporting a relay service according to an exemplary embodiment of the present invention.

As described above, the wireless communication system performs communications using a frame structure of FIG. 4 to support the relay service.

FIG. 4 illustrates a frame structure for supporting a relay service according to an exemplary embodiment of the present invention.

An i-th frame 400 of FIG. 4 includes a DownLink (DL) subframe 410 and an UpLink (UL) subframe 420. Using time resources, the DL subframe 410 and the UL subframe 420 are divided to first intervals 411 and 421 and second intervals 413 and 423 respectively. A time guard interval Transmit/receive Transition Gap (TTG) 431 is interposed between the DL subframe 410 and the UL subframe 420. A time guard interval Received/transmit Transition Gap (RTG) 433 is interposed between the i-th frame 400 and an (i+1)-th frame 470.

To communicate using the frame 400, the BS 450 transmits a sync channel, control information, and DL bursts to the MS1 in the service coverage area during the first interval 411 of the DL subframe 410. Herein, the control information includes resource allocation information about the first intervals 411 and 421 of the DL subframe 410 and the UL subframe 420 for the BS-MS link. For example, the BS 450 constitutes the control information as shown in Table 1.

TABLE 1

| | FCH |
|---|---|
| DL MAP | MAC Header |
| | MAC Management Type |
| PHY | Frame Duration |
| Synchronization | Frame Number |
| | DCD Count |
| | BS ID |
| | Zone Switch IE |
| | Region Area Information |
| | User Specific Resource allocation information of region (411) |
| UL MAP | MAC Header |
| | MAC Management Type |
| | Uplink Channel ID |
| | UCD Count |
| | Allocation Start time |
| | User Specific Resource allocation information of region (421) |

In Table 1, the control information includes a Frame Control Header (FCH) including information for decoding MAP information, a DL MAP including the resource allocation information of the DL frame 410 of the BS 450, and a UL MAP including the resource allocation information of the UL subframe 420 of the BS 450.

In the second interval 413 of the DL subframe 410, the BS 450 transmits control information, DL bursts, and a sync channel to the RS 460. The control information includes resource allocation information about the second intervals 413 and 423 of the DL subframe 410 and the UL subframe 420 for the BS-RS link. The DL bursts of the DL subframe 410 include resource allocation information of the control information transmitted from the RS to the MS in the first interval of the (i+1)-th frame. Accordingly, the control information includes resource allocation information relating to the resource allocation information of the control information, which is contained in the DL bursts, transmitted from the RS to the MS in the first interval of the (i+1)-th frame. For example, the BS can construct the control information as shown in Table 2.

TABLE 2

| | FCH |
|---|---|
| DL MAP | MAC Header |
| | MAC Management Type |
| PHY | Frame Duration |
| Synchronization | Frame Number |
| | DCD Count |
| | BS ID |
| | Zone Switch IE |
| | RS Specific Resource allocation information of region (413) |
| UL MAP | MAC Header |
| | MAC Management Type |
| | Uplink Channel ID |
| | UCD Count |
| | Allocation Start time |
| | User Specific Resource allocation information of region (423) |

In Table 2, the control information includes a FCH including information for decoding MAP information, a DL MAP including the resource allocation information of the DL subframe 410 for the communications between the BS 450 and the RS 460, and a UL map including the resource allocation information of the UL subframe 420 for the communications between the BS 450 and the RS 460.

The BS 450 receives UL bursts from the MS1 in the first interval 421 of the UL subframe 420. The BS 450 receives UL bursts from the RS 460 in the second interval 423.

The RS 460 transmits a sync channel, control information, and DL bursts to the MS2 in the service coverage area during the first interval 411 of the DL subframe 410. The control information includes resource allocation information about the first intervals 411 and 421 of the DL subframe 410 and the UL subframe 420 of the RS-MS link. For example, the RS 460 can constitute the control information as shown in Table 3.

TABLE 3

| | FCH |
|---|---|
| DL MAP | MAC Header |
| | MAC Management Type |
| | PHY        Frame Duration |
| | Synchronization     Frame Number |
| | DCD Count |
| | RS ID |
| | Zone Switch IE |
| | Region Area Information |
| | MS Specific Resource allocation information of region (413) |
| UL MAP | MAC Header |
| | MAC Management Type |
| | Uplink Channel ID |
| | UCD Count |
| | Allocation Start time |
| | User Specific Resource allocation information of region (423) |

In Table 3, the control information includes a FCH including information for decoding MAP information, a DL MAP including the resource allocation information of the DL subframe 410 of the RS 460, and a UL MAP including the resource allocation information of the UL subframe 420 of the RS 460.

The DL bursts sent to the MS2 in the first interval 411 include data to relay to the MS2 among data provided from the BS in the second interval of the DL subframe of the (i−1)-th frame.

The RS 460 receives control information, DL bursts, and a sync channel from the BS 450 in the second interval 413.

The RS 460 receives UL bursts from the MS2 in the first interval 421 of the UL subframe 420. The RS 460 transmits the UL bursts received from the MS2 to the BS 450 in the second interval 423.

In the frame of the RS 460, a time guard interval Relay TTG (R-TTG) 435 is inserted between the first interval 411 and the second interval 413 of the DL subframe 410, and a time guard interval R-RTG 437 is inserted between the first interval 421 and the second interval 423 of the UL subframe 420.

Using the frame structure constituted as above, the wireless communication system supporting the relay service can select the relay mode based on the channel state. The wireless communication system can select the relay mode using a channel capacity, a radio channel environment, and an Adaptive Modulation and Coding (AMC) level. Herein, the radio channel environment indicates a channel variation of the radio channel for providing the relay service.

To select the relay mode using the channel capacity, the wireless communication system can use Equation (1).

$$D = \frac{k(\log(1 + CINR_{simple}))}{\log(1 + CINR_{cooperative}))} \quad (1)$$

In Equation (1), D indicates a reference value for selecting the relay mode according to the channel capacity and k indicates a random variable for selecting the cooperative relay mode. The smaller k is, the greater probability to select the cooperative relay mode. $CINR_{simple}$ denotes a Carrier to Interference and Noise Ratio (CINR) of the simple relay mode and $CINR_{cooperative}$ denotes a CINR of the cooperative relay mode.

As expressed in Equation (1), the wireless communication system calculates the reference value for determining the relay mode using the ratio of the channel capacity of the simple relay mode to the channel capacity of the cooperative relay mode in a Gaussian channel. Hence, when the reference value D acquired in consideration of the channel capacities is greater than 1, the wireless communication system selects the simple relay mode. When the reference value D is smaller than 1, the wireless communication system selects the cooperative relay mode.

The CINR of the simple relay mode, which is used to calculate the channel capacity ratio in Equation (1), is calculated using Equation (2). Herein, by way of example, it is assumed that the wireless communication system includes 19 cells.

$$CINR_{simple} = \frac{P_{best}}{\sum_{j \neq i}^{19} \left( BS^j + \sum_{\gamma=1}^{N_{gama}(j)} RS^\gamma \right) + BS^i + \sum_{\gamma=1}^{N_\gamma(i)} RS^\gamma - P_{best}} \quad (2)$$

In Equation (2), $CINR_{simple}$ indicates the CINR of the simple relay mode and $P_{best}$ indicates the best signal strength among strengths of signals received at the MS from the BS or the RS. $BS^j$ indicates the signal strength of neighbor-cell BSs, $RS^j$ indicates the signal strength of neighbor-cell RSs, $BS^i$ indicates the signal strength of a serving cell BS, and $RS^\gamma$ indicates the signal strength of serving cell RSs. $N_\gamma$ indicates the number of RSs in one cell.

As expressed in Equation (2), the CINR of the simple relay mode can be acquired from the ratio of the received signal strength of one serviced node to the received signal strength of the neighbor nodes.

The CINR of the cooperative relay mode, which is used to calculate the channel capacity ratio in Equation (2), is calculated using Equation (3).

$$CINR_{cooperative} = \frac{P_{best} + P_{second}}{\sum_{j \neq i}^{19} \left( BS^j + \sum_{\gamma=1}^{N_\gamma(j)} RS^\gamma \right) + BS^i + \sum_{\gamma=1}^{N_\gamma(j)} RS^\gamma - P_{best} - P_{second}} \quad (3)$$

In Equation (3), $CINR_{cooperative}$ indicates the CINR of the cooperative relay mode, $P_{best}$ indicates the best signal strength of the signal strengths of the signals received at the MS from the BS or the RS, and $P_{second}$ indicates the second best signal strength. $BS^j$ indicates the strength of the signal of neighbor-cell BSs, $RS^j$ indicates the strength of the signal of neighbor-cell RSs, $BS^i$ indicates the strength of the signal of the serving cell BS, and $RS^\gamma$ indicates the signal strength of the serving cell RSs. $N^\gamma$ indicates the number of RSs in one cell.

As expressed in Equation (3), the CINR of the cooperative relay mode can be acquired from the ratio of the received signal strength of the serviced nodes to the received signal strength of the neighbor nodes.

To select the relay mode by taking into account the channel variation, the wireless communication system can use Equation (4).

$$D_{th} = f(CINR_{simple}, \gamma_{simple}, \gamma_{cooperative}) \quad (4)$$

In Equation (4), $D_{th}$ indicates a reference value for selecting the relay mode based on the channel variation and $CINR_{simple}$ indicates the CINR of the simple relay mode. $\gamma_{simple}$ indicates a coefficient according to the multipath attenuation and fading at the receiving terminal in the simple relay mode and $\gamma_{cooperative}$ indicates a coefficient according to the multipath attenuation and fading at the receiving terminal in the cooperative relay mode. Herein, $\gamma_{simple}$ and $\gamma_{cooperative}$ have different values on a terminal basis per frame.

By selecting the relay mode based on the channel variation using Equation (4), the wireless communication system can adaptively select the relay mode in the actual wireless environment. Herein, the wireless communication system determines the relay mode based on the channel variation by applying $CINR_{simple}$, $\gamma_{simple}$, and $\gamma_{cooperative}$ as expressed in Equation (4). The wireless communication system can change the relay mode determined by comparing the reference value with 1 according to the function which calculates the reference value based on the channel variation.

To select the relay mode using the AMC level, the wireless communication system can use Equation (5).

$$D_{AMC} = \frac{L_{simple}(CINR_{simple})}{L_{cooperative}(CINR_{cooperative})} \quad (5)$$

In Equation (5), $D_{AMC}$ indicates a reference value for selecting the relay mode based on the AMC level, $CINR_{simple}$ indicates the CINR of the simple relay mode, and $CINR_{cooperative}$ indicates the CINR of the cooperative relay mode. $L_{simple}(CINR_{simple})$ indicates the AMC level of the simple relay mode and $L_{cooperative}(CINR_{cooperative})$ indicates the AMC level of the cooperative relay mode. The better the channel state, the higher $L_{simple}(CINR_{simple})$.

As expressed in Equation (5), the wireless communication system calculates the reference value for determining the relay mode by applying the ratio of the AMC level of the simple relay mode to the ratio of the cooperative relay mode. When the reference value D, acquired by considering the AMC level, is greater than 1, the wireless communication system selects the simple relay mode. When the reference value D is smaller than 1, the wireless communication system selects the cooperative relay mode.

In this exemplary embodiment of the present invention, the wireless communication system can select the relay mode based on the channel capacity of the receiving terminal, the channel variation, and the AMC level. The selection of the relay mode based on the AMC level exhibits better outage performance of the system than the relay mode selection based on the channel capacity or the channel variation. For example, when the MS is serviced from two RSs in the cooperative relay mode, the wireless communication system theoretically has twice the channel capacity achieved by using the simple relay mode. However, in an actual wireless environment, a wireless communication system with a low CINR cannot get twice channel capacity achieved by using the simple relay mode. Accordingly, there may be a difference between the relay mode theoretically selected using Equation (1) and the relay mode selected in the actual environment. Yet, since the AMC level can reflect the change of the CINR, the wireless communication system can enhance the system outage performance by using the AMC level instead of using the channel capacity or the channel variation.

In the wireless communication system, the BS and the MS can select the relay mode using the channel capacity, the wireless environment, and the AMC level.

Figure 5:
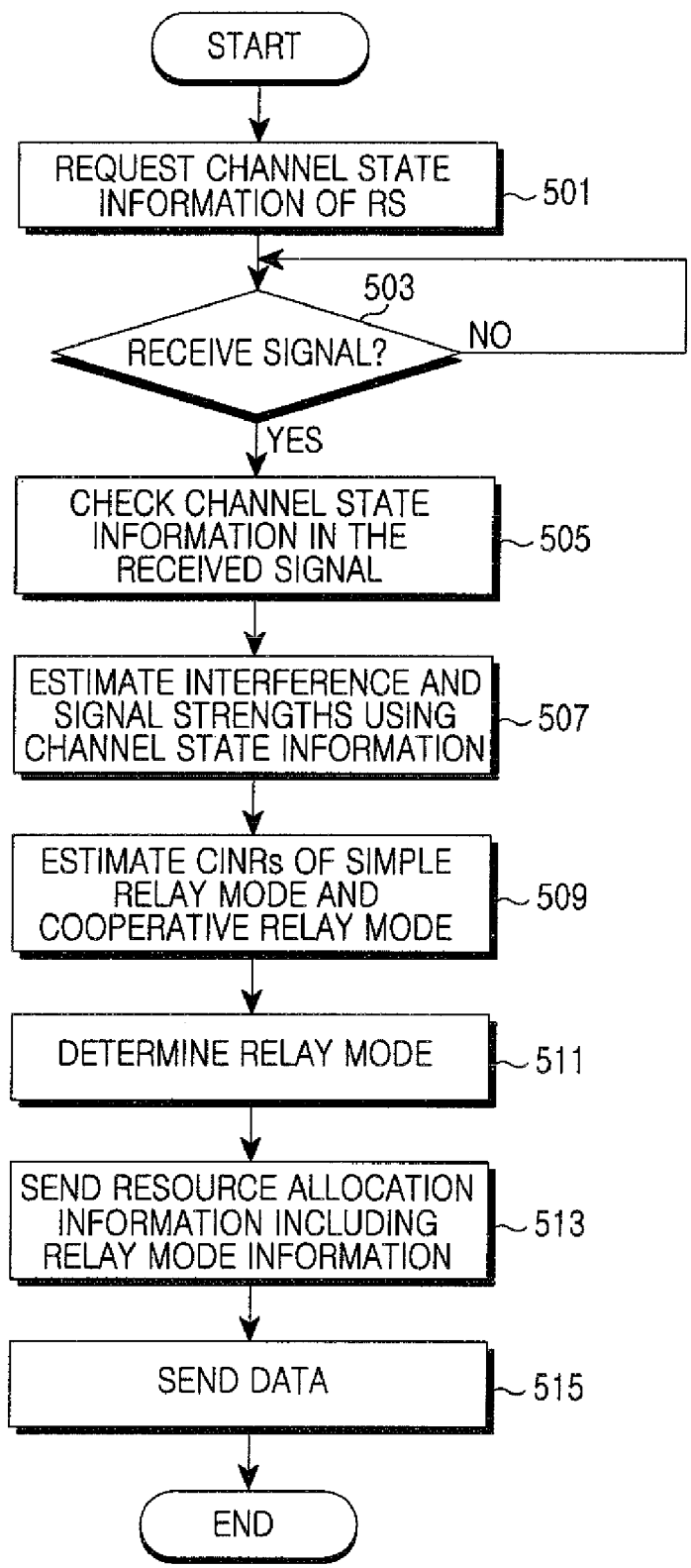
FIG. 5 illustrates operations of a BS for determining a relay mode according to an exemplary embodiment of the present invention.
Figure 6:
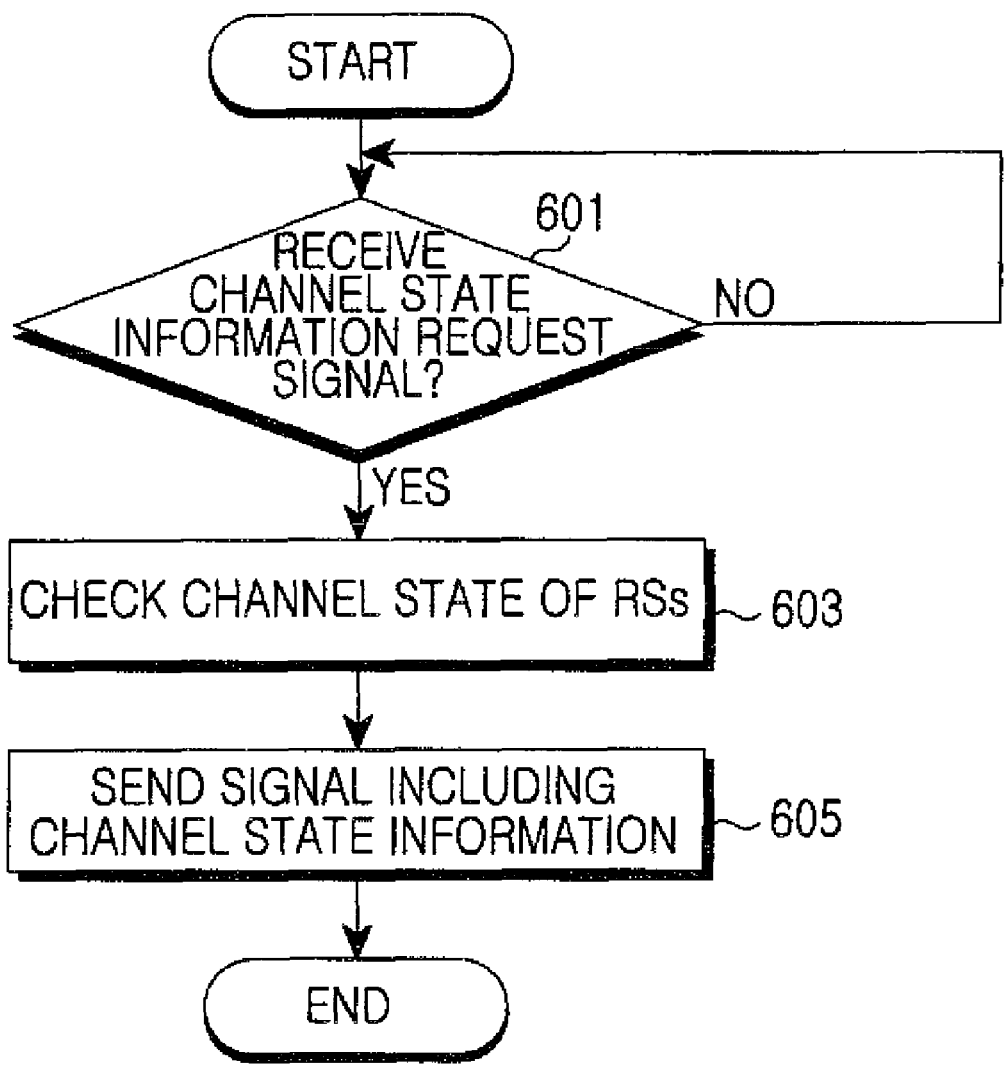
FIG. 6 illustrates operations of an MS for determining a relay mode according to an exemplary embodiment of the present invention.

To select the relay mode, the BS operates as shown in FIG. 5. At this time, the MS operates as shown in FIG. 6.

FIG. 5 illustrates operations of a BS for determining a relay mode according to an exemplary embodiment of the present invention.

In step 501, the BS requests channel state information of RSs from the MS to select the relay mode so as to provide the relay service. For example, the BS transmits a SCAN-REQ signal including the channel state information request signal to the MS.

In step 503, the BS checks whether a signal is received from the MS.

Upon receiving the signal, the BS confirms the channel state information between the RSs and the MS in the received signal in step 505. For example, the BS may check at least one of a Received Signal Strength Indicator (RSSI) and CINR information in the received signal.

In step 507, the BS estimates an interference strength and a signal strength using the channel state information. The BS estimates the interference strength and the signal strength using the channel state information based on Equation (6).

$$RSSI_{RS_i} = P_{RS_i} + I_{RS_i}, \; CINR_{RS_i} = \frac{P_{RS_i}}{I_{RS_i}} \quad (6)$$

$$I_{RS_i} = \frac{RSSI_{RS_i}}{(1 + CINR_{RS_i})}, \; P_{RS_i} = \frac{RSSI_{RS_i}}{(1 + 1/CINR_{RS_i})}$$

In Equation (6), $RSSI_{RS_i}$ indicates the RSSI between the MS and the i-th RS and $CINR_{RS_i}$ indicates the CINR between the MS and the i-th RS. $P_{RS_i}$ indicates the interference strength between the MS and the i-th RS and $I_{RS_i}$ indicates the signal strength between the MS and the i-th RS.

In step 509, the BS estimates CINRs of the simple relay mode and the cooperative relay mode using the interference strength and the signal strength. For example, the BS estimates the CINRs of the simple relay mode and the cooperative relay mode using Equation (7).

$$CINR_{cooperative} = \frac{2\alpha(P_{RS_1} + P_{RS_2})}{(I_{RS_1} - P_{RS_i}) + (I_{RS_2} - P_{RS_1})} \quad (7)$$

$$CINR_{simple_{RS_1}} = CINR_{RS_1}, \; CINR_{simple_{RS_2}} = CINR_{RS_2}$$

$CINR_{simple}$ indicates the CINR of the simple relay mode and $CINR_{cooperative}$ indicates the CINR of the cooperative relay mode. $P_{RS_i}$ indicates the interference strength between the MS and the i-th RS and $I_{RS_i}$ indicates the signal strength between the MS and the i-th RS.

In step 511, the BS determines the relay mode for providing the relay service using the CINRs of the simple relay mode and the cooperative relay mode. For example, to select the relay mode based on the channel capacity, the BS uses the ratio of the CINR of the simple relay mode to the CINR of the cooperative relay mode based on Equation (1). To select the relay mode based on the channel variation, the BS uses Equation (4). To select the relay mode based on the AMC level, the BS utilizes the ratio of the AMC level of the simple relay mode to the AMC level of the cooperative relay mode according to the CINRs as expressed in Equation (5).

In step 513, the BS transmits resource allocation information including the relay mode to the RSs and the MS.

In step 515, the BS transmits data to the RSs or the MS according to the resource allocation information.

Next, the BS finishes this process.

When the BS transmits the determined relay mode to the RS, the RS provides the relay service to the MS in the relay mode provided from the BS.

FIG. 6 illustrates operations of the MS for determining a relay mode according to an exemplary embodiment of the present invention.

In step 601, the MS checks whether the channel state information request signal is received from the serving BS. For example, the MS checks whether the SCAN-REQ signal received from the BS includes the channel state request signal.

Upon receiving the channel state request signal, the MS checks channel states with the RSs from which signals can be received in step 603. That is, the MS measures the RSSI and the CINR using the signals received from the RSs.

In step 605, the MS transmits the channel state information to the BS. In doing so, the MS transmits a SCAN-REP signal including the channel state information to the BS.

Next, the MS finishes this process.

When the BS determines the relay mode, the MS transmits the channel state information of the RSs to the BS as requested by the BS. Next, the MS receives the relay service from the RSs in the determined relay mode.

Figure 7:
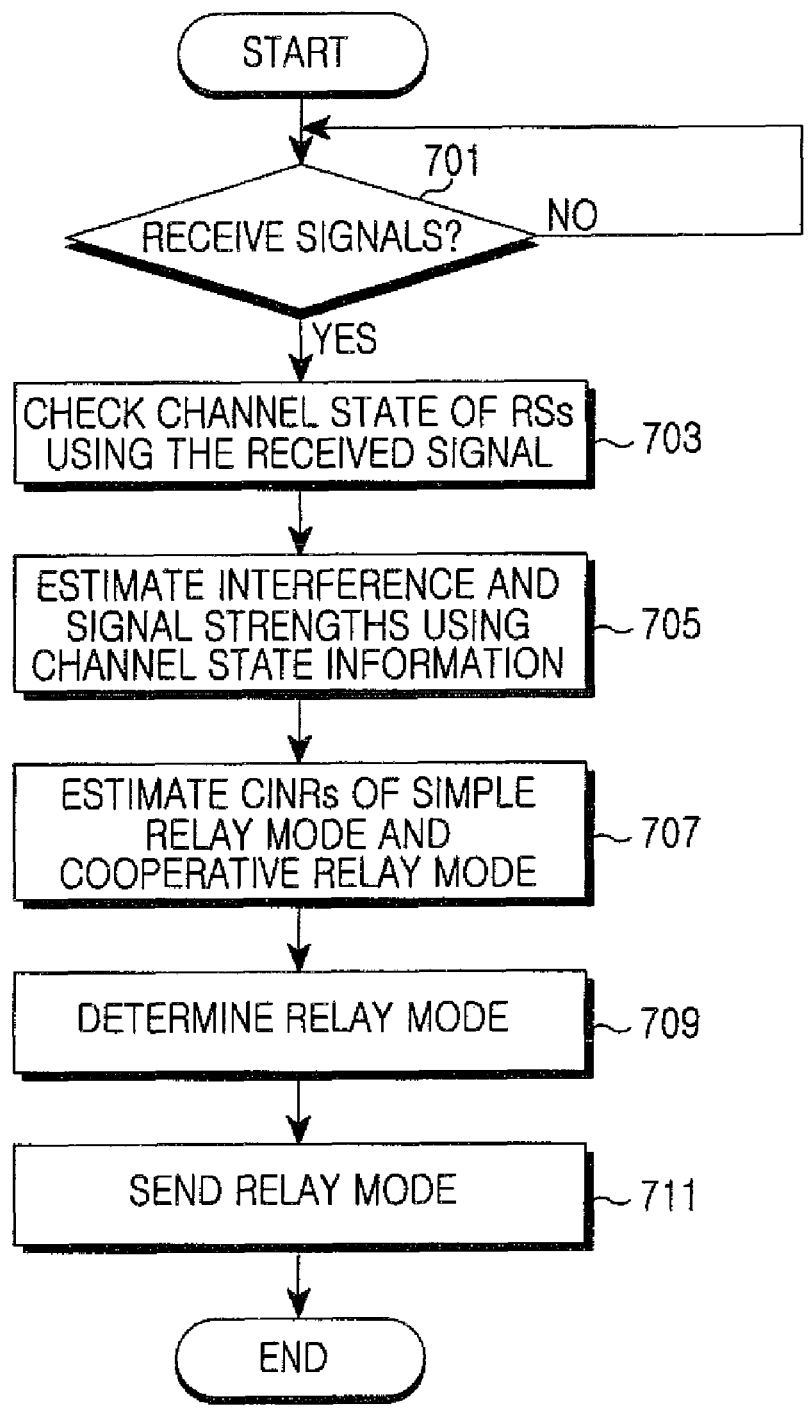
FIG. 7 illustrates operations of an MS for determining a relay mode according to another exemplary embodiment of the present invention.

Now, to select the relay mode, the MS operates as shown in FIG. 7.

FIG. 7 illustrates operations of an MS for determining a relay mode according to another exemplary embodiment of the present invention.

In step 701, the MS checks whether signals are received from the RSs.

Upon receiving the signals, the MS checks the channel state of the RSs using the received signals in step 703. To do so, the MS checks the RSSI and the CINR using the received signals.

In step 705, the MS estimates the interference strength and the signal strength using the channel state information. The MS estimates the interference strength and the signal strength using the channel state information of the RSs as in Equation (6).

In step 707, the MS estimates CINRs of the simple relay mode and the cooperative relay mode using the interference strength and the signal strength. For example, the MS estimates the CINRs of the simple relay mode and the cooperative relay mode using Equation (7).

In step 709, the MS determines the relay mode for providing the relay service using the CINRs of the simple relay mode and the cooperative relay mode. For example, to select the relay mode based on the channel capacity, the MS uses the ratio of the CINR of the simple relay mode to the CINR of the cooperative relay mode based on Equation (1). To select the relay mode based on the channel variation, the MS uses Equation (4). To select the relay mode based on the AMC level, the MS uses the ratio of the AMC level of the simple relay mode to the AMC level of the cooperative relay mode according to the CINRs as expressed in Equation (5).

In step 711, the MS transmits the relay mode to the RSs and the BS.

Next, the MS finishes this process.

In the following, structures of the BS and the MS for selecting the relay mode in the wireless communication system are described. When the BS selects the relay mode, the BS is constructed as shown in FIG. 8.

Figure 8:
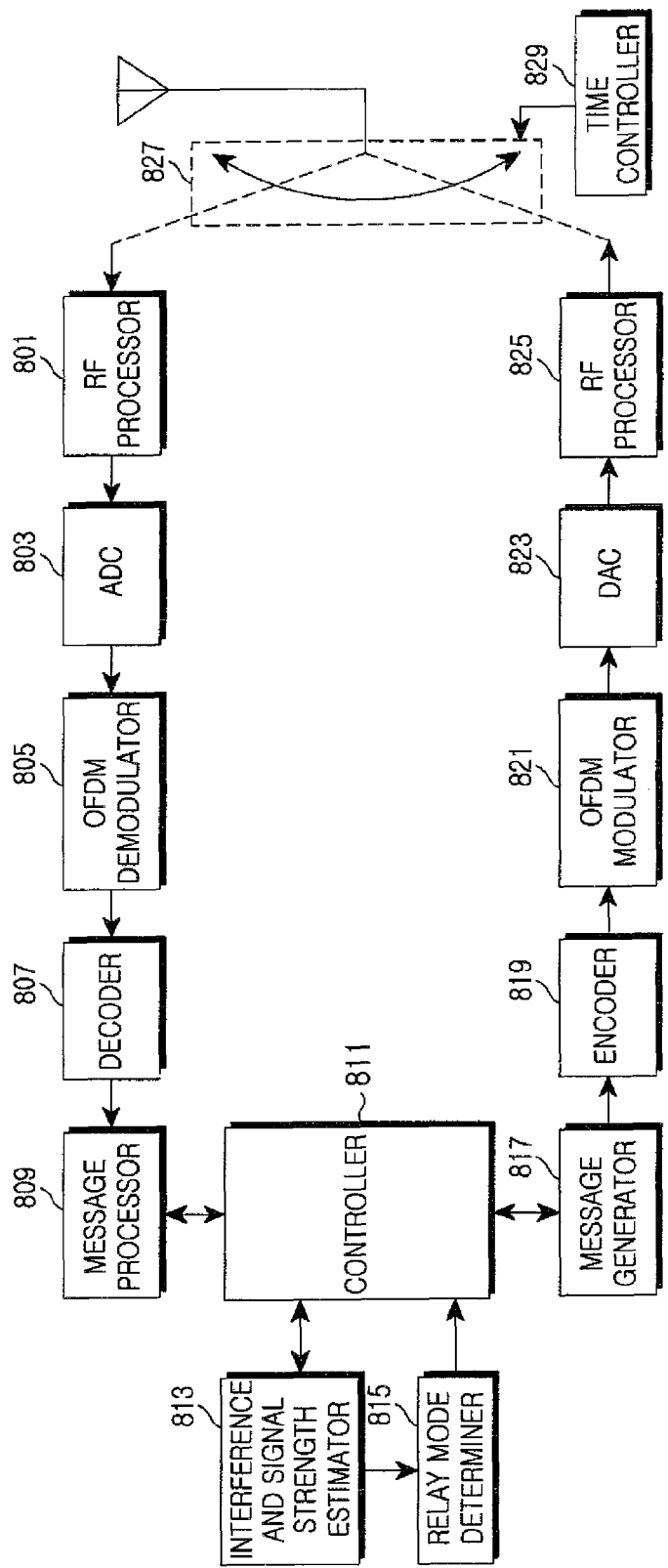
FIG. 8 illustrates a BS for determining a relay mode according to an exemplary embodiment of the present invention.

FIG. 8 is a block diagram of a BS for determining a relay mode according to an exemplary embodiment of the present invention.

The BS of FIG. 8 includes a Radio Frequency (RF) processor 801, an Analog/Digital Converter (ADC) 803, an Orthogonal Frequency Division Multiplexing (OFDM) demodulator 805, a decoder 807, a message processor 809, a controller 811, an interference and signal strength estimator 813, a relay mode determiner 815, a message generator 817, an encoder 819, an OFDM modulator 821, a Digital/Analog Converter (DAC) 823, an RF processor 825, a switch 827, and a time controller 829.

The time controller 829 controls a switching operation of the switch 827 based on the frame synchronization. For example, in the Rx interval, the time controller 829 controls the switch 827 to connect an antenna to the RF processor 801 of the receiving stage. In the Tx interval, the time controller 829 controls the switch 827 to connect the antenna to the RF processor 825 of the transmitting stage.

In the Rx interval, the RF processor 801 converts an RF signal received over the antenna into a baseband analog signal. The ADC 803 converts the analog signal output from the RF processor 801 into sample data. The OFDM demodulator 805 Fast Fourier Transform (FFT)-processes the sample data output from the ADC 803 into frequency-domain data.

The decoder 807 selects data of subcarriers to receive from the frequency-domain data output from the OFDM demodulator 805. Next, the decoder 807 demodulates and decodes the selected data at a corresponding Modulation and Coding Scheme (MCS) level.

The message processor 809 decomposes a control message provided from the decoder 807 and provides the result to the controller 811. For example, the message processor 809 extracts the channel state information between the MS and the RSs from the SCAN-REP message received from the MS and provides the extracted information to the controller 811. Herein, the channel state information includes the RSSI and the CINR.

The controller 811 processes the information provided from the message processor 809 and provides the result to the message generator 817.

The interference and signal strength estimator 813 estimates the interference strength and the signal strength between the MS and the RS using the channel state information between the MS and the RSs, which is provided from the controller 811. The interference and signal strength estimator 813 estimates the interference strength and the signal strength using Equation (6).

The relay mode determiner 815 calculates the CINRs of the simple relay mode and the cooperative relay mode using the interference strength and the signal strength provided from the interference and signal strength estimator 813. For example, the relay mode determiner 815 calculates the CINRs of the simple relay mode and the cooperative relay mode using Equation (7).

Also, the relay mode determiner 815 determines the relay mode for supporting the relay service using the CINRs of the simple relay mode and the cooperative relay mode.

For instance, based on the channel capacity, the relay mode determiner 815 determines the relay mode using the ratio of the CINRs of the simple relay mode and the cooperative relay mode as expressed in Equation (1). Based on the channel variation, the relay mode determiner 815 determines the relay mode using Equation (4). Based on the AMC level, the relay mode determiner 815 determines the relay mode using the ratio of the AMC levels of the simple relay mode and the cooperative relay mode according to the CINRs based on Equation (5).

The message generator 817 generates a message with the information provided from the controller 811 and outputs the generated message to the encoder 819 of the physical layer. For example, the message generator 817 generates the SCAN-REQ message including the channel state information request message under the control of the controller 811. The message generator 817 generates the control message including the relay mode information determined at the relay mode determiner 815 under the control of the controller 811.

The encoder 819 encodes and modulates the data output from the message generator 817 at a corresponding MCS level. The OFDM modulator 821 Inverse FFT (IFFT)-processes the frequency-domain data output from the encoder 819 into time-domain sample data. The DAC 823 converts the sample data output from the OFDM modulator 821 into an analog signal. The RF processor 825 converts the baseband analog signal output from the DAC 823 into an RF signal and transmits the RF signal over the antenna.

Figure 9:
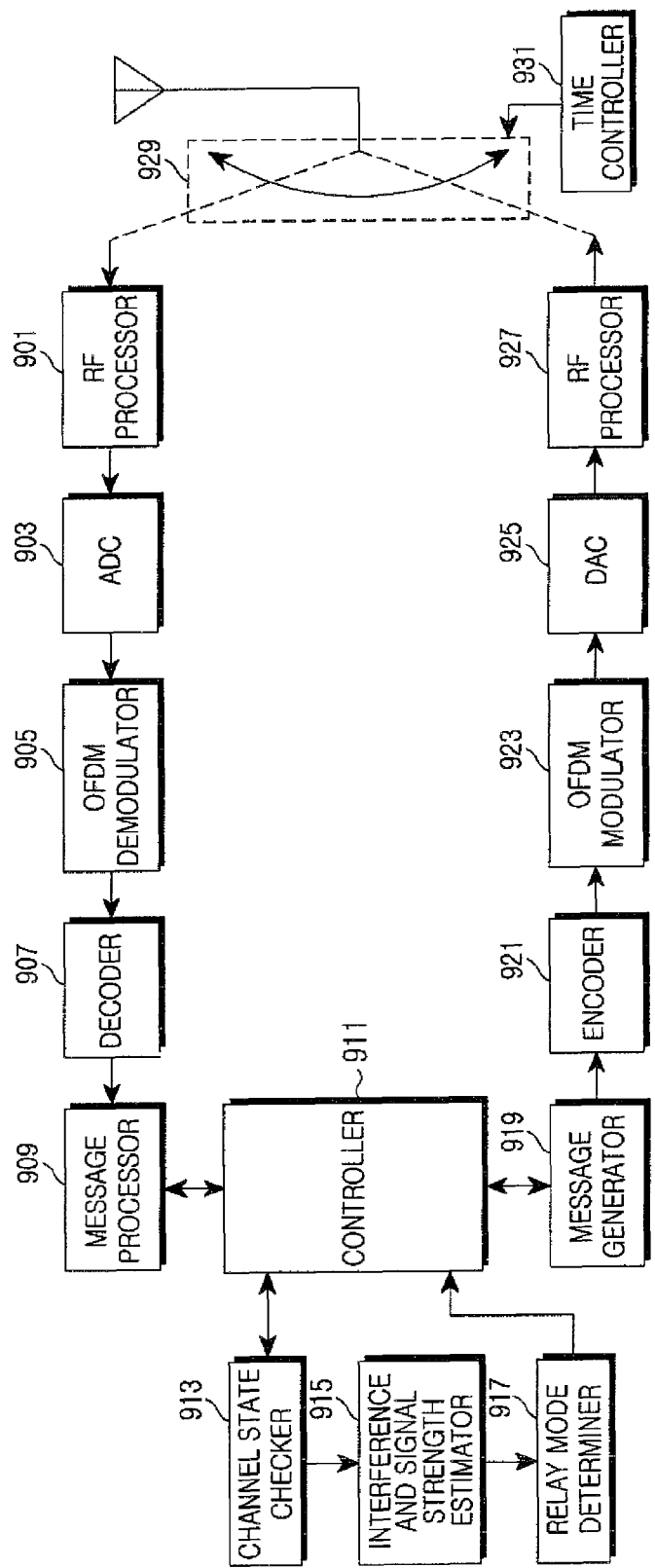
FIG. 9 illustrates an MS for determining a relay mode according to an exemplary embodiment of the present invention.

When the MS selects the relay mode, the MS is constructed as shown in FIG. 9.

FIG. 9 is a block diagram of an MS for determining a relay mode according to an exemplary embodiment of the present invention.

The MS of FIG. 9 includes an RF processor 901, an ADC 903, an OFDM demodulator 905, a decoder 907, a message processor 909, a controller 911, a channel state checker 913, an interference and signal strength estimator 915, a relay mode determiner 917, a message generator 919, an encoder 921, an OFDM modulator 923, a DAC 925, an RF processor 927, a switch 929, and a time controller 931.

The time controller 931 controls a switch operation of the switch 929 based on the frame synchronization. For example, in the Rx interval, the time controller 931 controls the switch 929 to connect an antenna to the RF processor 901 of the receiving stage. In the Tx interval, the time controller 931 controls the switch 929 to connect the antenna to the RF processor 927 of the transmitting stage.

In the Rx interval, the RF processor 901 converts an RF signal received over the antenna into a baseband analog signal. The ADC 903 converts the analog signal output from the RF processor 901 into sample data. The OFDM demodulator 905 FFT-processes the sample data output from the ADC 903 into frequency-domain data.

The decoder 907 selects data of subcarriers to receive from the frequency-domain data output from the OFDM demodulator 905. Next, the decoder 907 demodulates and decodes the selected data at a corresponding Modulation and Coding Scheme (MCS) level.

The message processor 909 decomposes a control message provided from the decoder 907 and provides the result to the controller 911.

The controller 911 processes the information provided from the message processor 909 and provides the result to the message generator 919.

The channel state checker 913 checks the channel state in relation with the RSs from the signals received from the RSs, which are output from the controller 911. The channel state checker 913 checks the RSSI and the CINR in relation with the RSs from the received signals.

The interference and signal strength estimator 915 estimates the interference strength and the signal strength with the RS using the channel state information of the RSs provided from the channel state checker 913. The interference and signal strength estimator 915 estimates the interference strength and the signal strength using Equation (6).

The relay mode determiner 917 calculates the CINRs of the simple relay mode and the cooperative relay mode using the interference strength and the signal strength provided from the interference and signal strength estimator 915. For example, the relay mode determiner 917 calculates the CINRs of the simple relay mode and the cooperative relay mode using Equation (7).

Also, the relay mode determiner 917 determines the relay mode for supporting the relay service using the CINRs of the simple relay mode and the cooperative relay mode.

For instance, based on the channel capacity, the relay mode determiner 917 determines the relay mode using the ratio of the CINRs of the simple relay mode and the cooperative relay mode as expressed in Equation (1). Based on the channel variation, the relay mode determiner 917 determines the relay mode using Equation (4). Based on the AMC level, the relay mode determiner 917 determines the relay mode using the ratio of the AMC levels of the simple relay mode and the cooperative relay mode according to the CINRs based on Equation (5).

The message generator 919 generates a message with the information provided from the controller 911 and outputs the generated message to the encoder 921 of the physical layer. The message generator 919 generates the control message including the relay mode information determined at the relay mode determiner 917 under the control of the controller 911.

The encoder 921 encodes and modulates the data output from the message generator 919 at a corresponding MCS level. The OFDM modulator 923 IFFT-processes the frequency-domain data output from the encoder 921 into time-domain sample data. The DAC 925 converts the sample data output from the OFDM modulator 923 into an analog signal. The RF processor 927 converts the baseband analog signal output from the DAC 925 into an RF signal and transmits the RF signal over the antenna.

As above, the wireless communication system selects the relay mode for supporting the relay service using the CINRs of the simple relay mode and the cooperative relay mode. In doing so, the wireless communication system selects the relay mode using the measured CINRs. The CINRs may be measured continuously, periodically, or on an as needed basis. Alternatively, the wireless communication system selects the relay mode using average CINRs of the simple relay mode and the cooperative relay mode for a preset duration of time.

Now, descriptions are provided of a performance change that occurs when the wireless communication system selectively uses the relay mode by taking into account the channel capacity, the channel variation, and the AMC level. When the wireless communication system selects the relay mode based on the channel capacity and the channel variation, the same performance change is exhibited. Hence, the description of the performance change, when the relay mode is selected based on the channel variation, is omitted.

Figure 10:
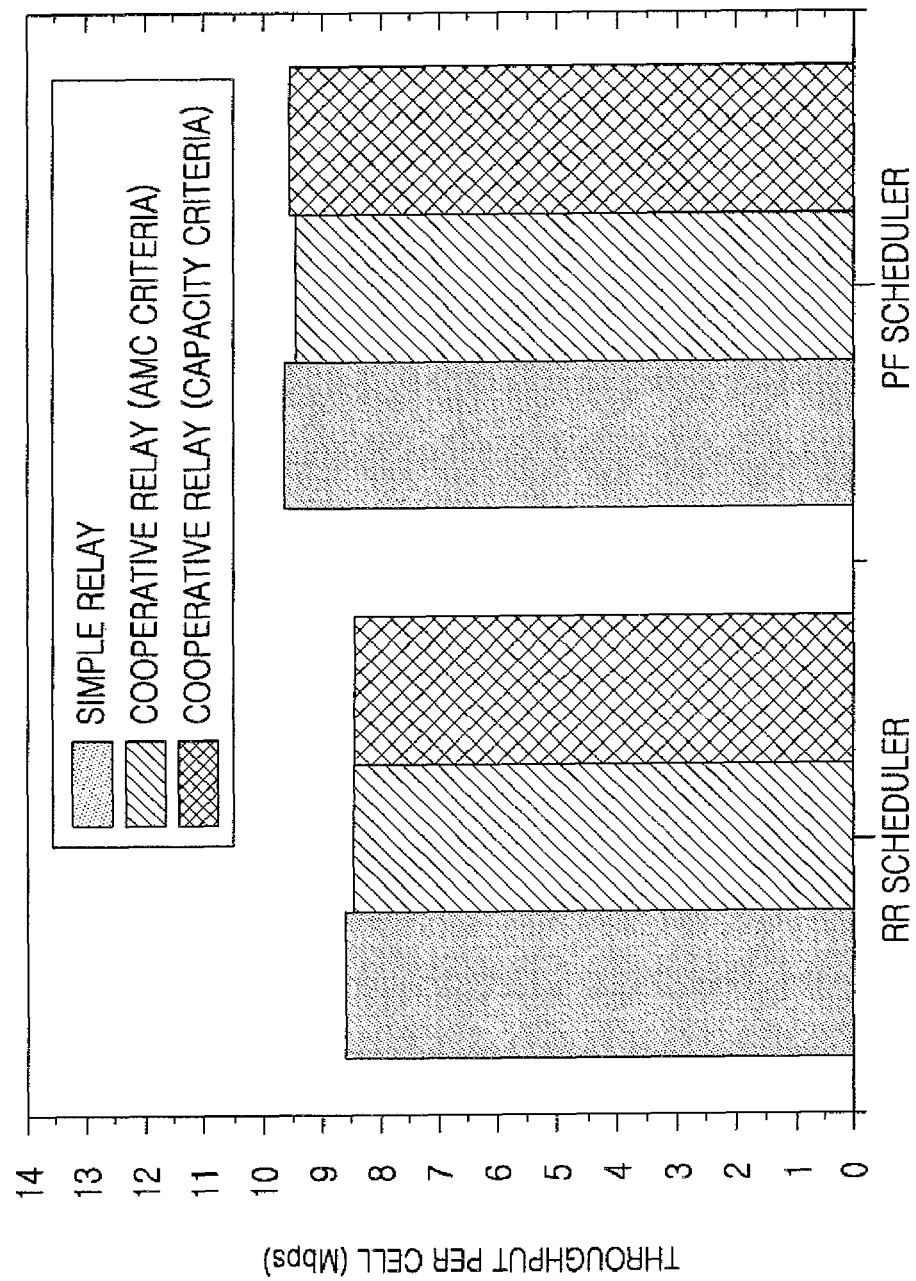
FIG. 10 illustrates a throughput graph of a system according to an exemplary embodiment of the present invention.

FIG. 10 illustrates a throughput graph of a system according to an exemplary embodiment of the present invention. The horizontal axis indicates scheduling methods and the vertical axis indicates a data rate per cell.

In particular, FIG. 10 depicts the system throughput when the wireless communication system uses the simple relay mode and the selective relay mode based on the channel capacity or the AMC level according to an exemplary embodiment of the present invention.

When the wireless communication system uses the simple relay mode, a better system throughput is achieved because the RSs can relay different data respectively. When the wireless communication system selectively uses the relay mode based on the channel capacity or the AMC level, the system throughput is similar to the simple relay mode.

Figure 11:
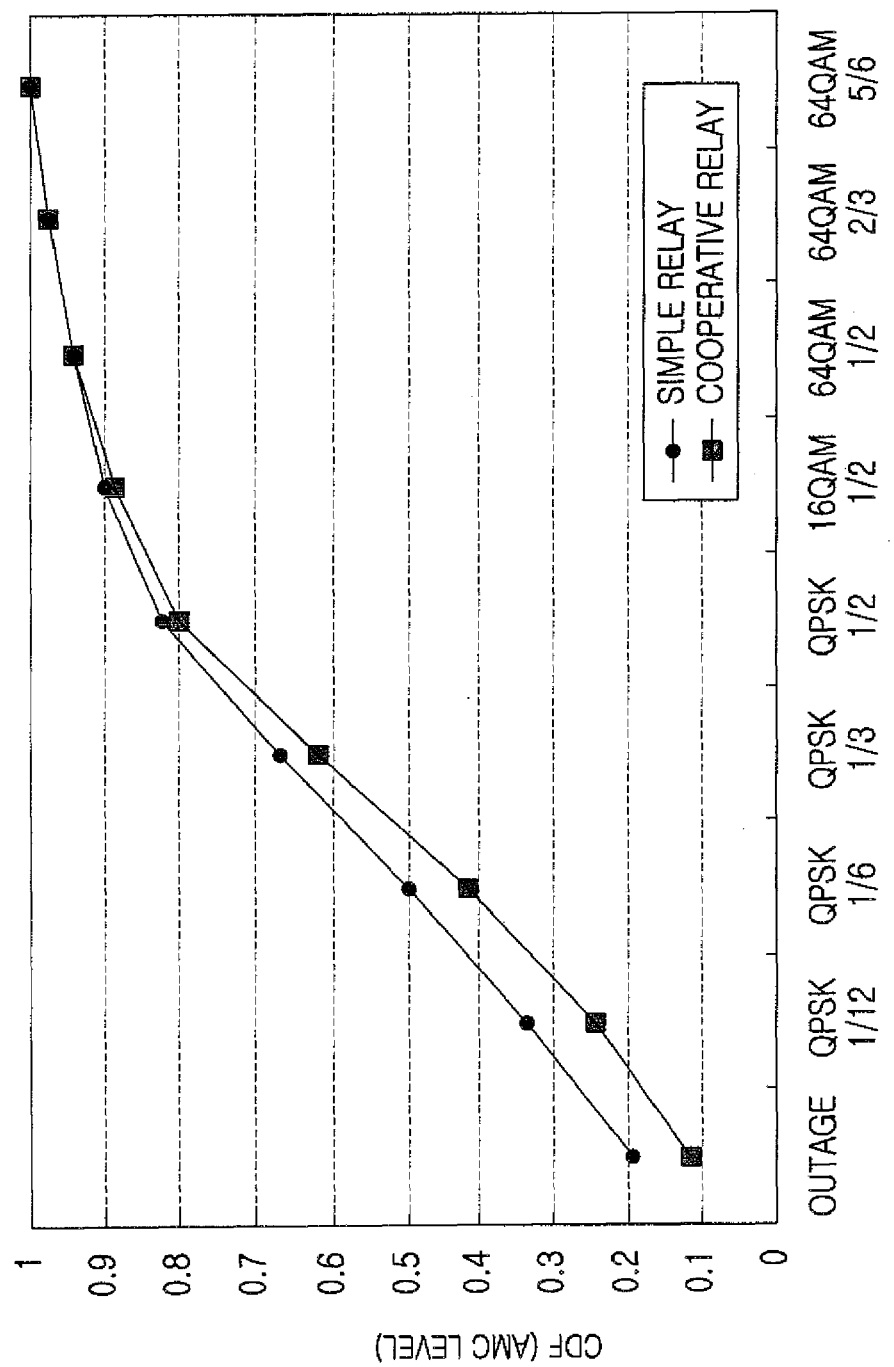
FIG. 11 illustrates an AMC level distribution according to an exemplary embodiment of the present invention.

FIG. 11 illustrates an AMC level distribution according to an exemplary embodiment of the present invention. The horizontally axis indicates AMC levels and the vertical axis indicates a Cumulative Density Function (CDF).

In particular, FIG. 11 depicts the distribution of the AMC level when the wireless communication system uses the selective relay mode based on the channel capacity or the AMC level.

When the wireless communication system selectively uses the relay mode based on the AMC level, the distribution of the AMC level increases, compared to the relay mode based on the channel capacity or the simple relay mode. In other words, when the wireless communication system uses the relay mode based on the AMC level, the probability of relaying the signal at the higher AMC level increases, compared to the relay mode based on the channel capacity.

Figure 12:
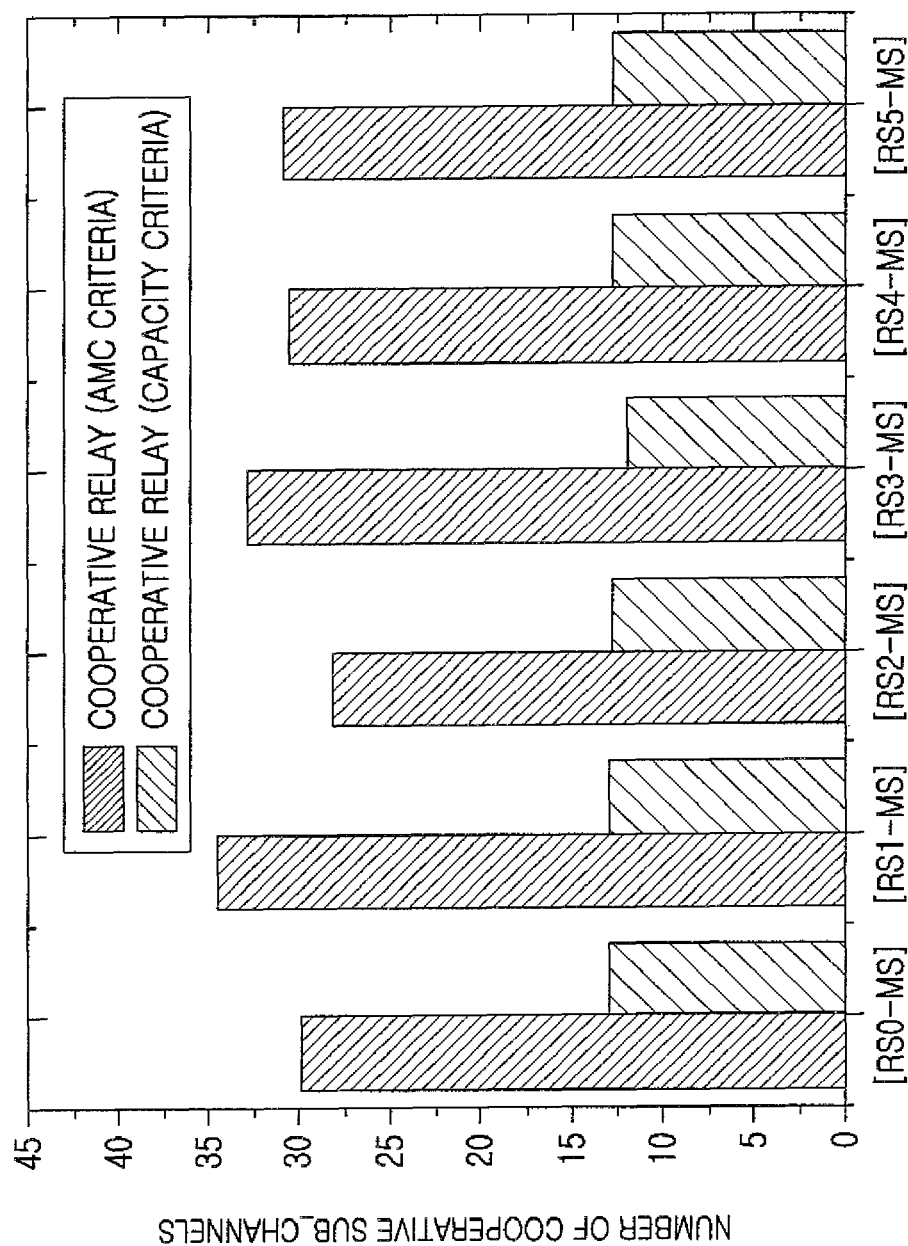
FIG. 12 illustrates the number of subchannels when a relay mode is selectively executed according to an exemplary embodiment of the present invention.

FIG. 12 illustrates the number of subchannels when a relay mode is selectively executed according to an exemplary embodiment of the present invention. The horizontal axis indicates links between the RS and the MS, and the vertical axis indicates the number of cooperative relay subchannels.

When the wireless communication system selects the relay mode based on the channel capacity and the AMC level, FIG. 12 depicts the probability of selecting the cooperative relay mode.

When the wireless communication system selects the relay mode based on the AMC level, the number of subchannels used for the cooperative relay is greater than the number of subchannels when the relay mode is selected based on the channel capacity. That is, when the wireless communication system selects the relay mode, the AMC level criteria exhibits a higher probability of selecting the cooperative relay mode than the channel capacity criteria.

Now, when the wireless communication system selects the relay mode based on the channel capacity, the performance change based on the cooperative relay mode random variable k of Equation (1) is illustrated. The first channel capacity criteria (Capacity_1 criteria) signify k being set to 2, and the second channel capacity criteria (Capacity_2 criteria) signify k being set to 1.5.

Figure 13:
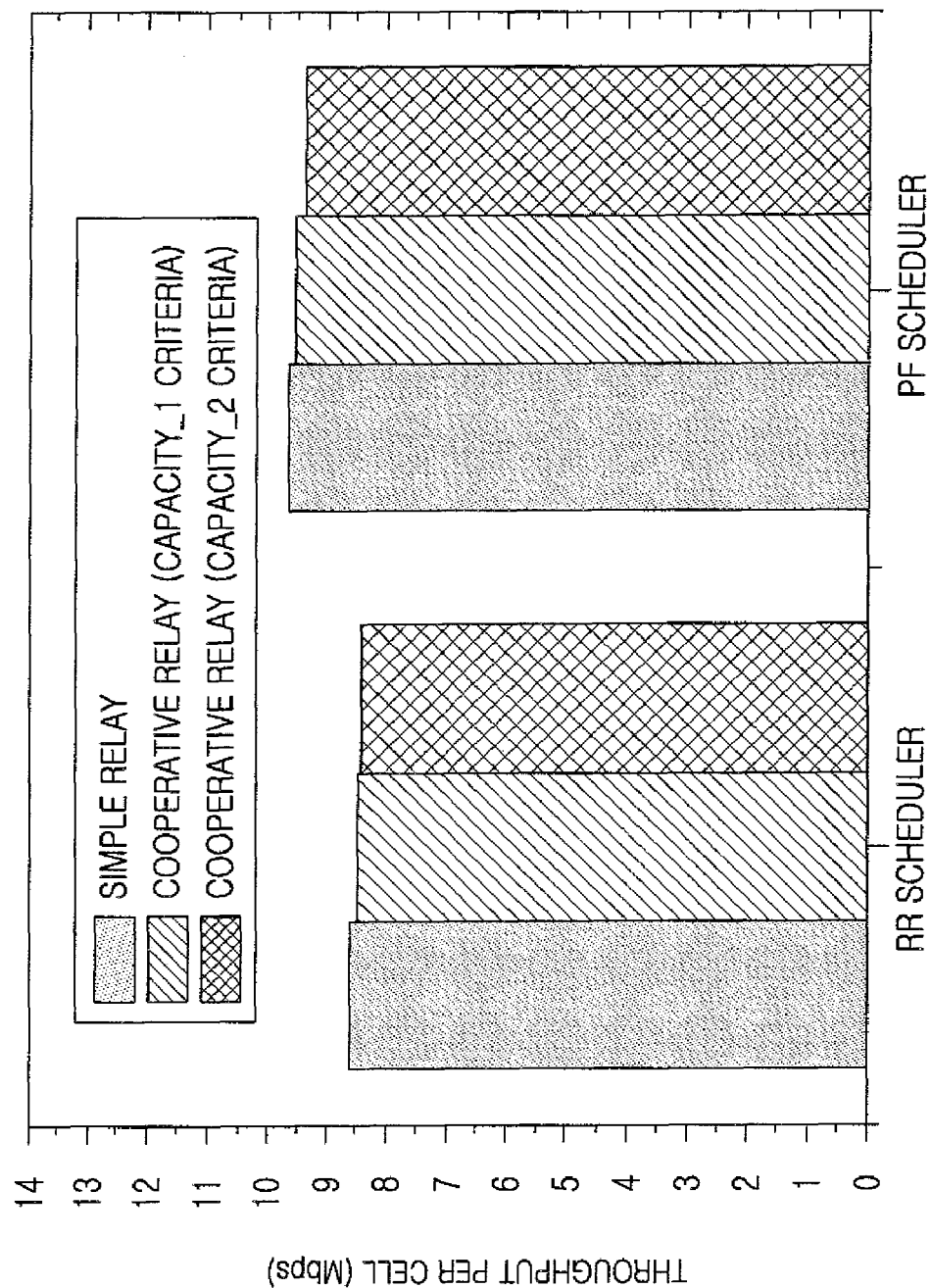
FIG. 13 illustrates a throughput graph of a system which selects a relay mode based on a channel capacity according to an exemplary embodiment of the present invention.

FIG. 13 illustrates a throughput graph of a system which selects a relay mode based on the channel capacity according to an exemplary embodiment of the present invention. The horizontal axis indicates scheduling methods, and the horizontal axis indicates the throughput per cell.

In particular, FIG. 13 depicts a system throughput according to the cooperative relay environmental variables when a wireless communication system uses a selective relay mode based on the channel capacity.

When the wireless communication system uses the simple relay mode, the RSs can relay different data respectively. Thus, the best system throughput is exhibited. When the wireless communication system selects the relay mode based on the channel capacity, the system throughput is similar to the simple relay mode. Yet, when the wireless communication system employs the first channel capacity criteria, the system throughput is better than when the second channel capacity criteria is employed.

Figure 14:
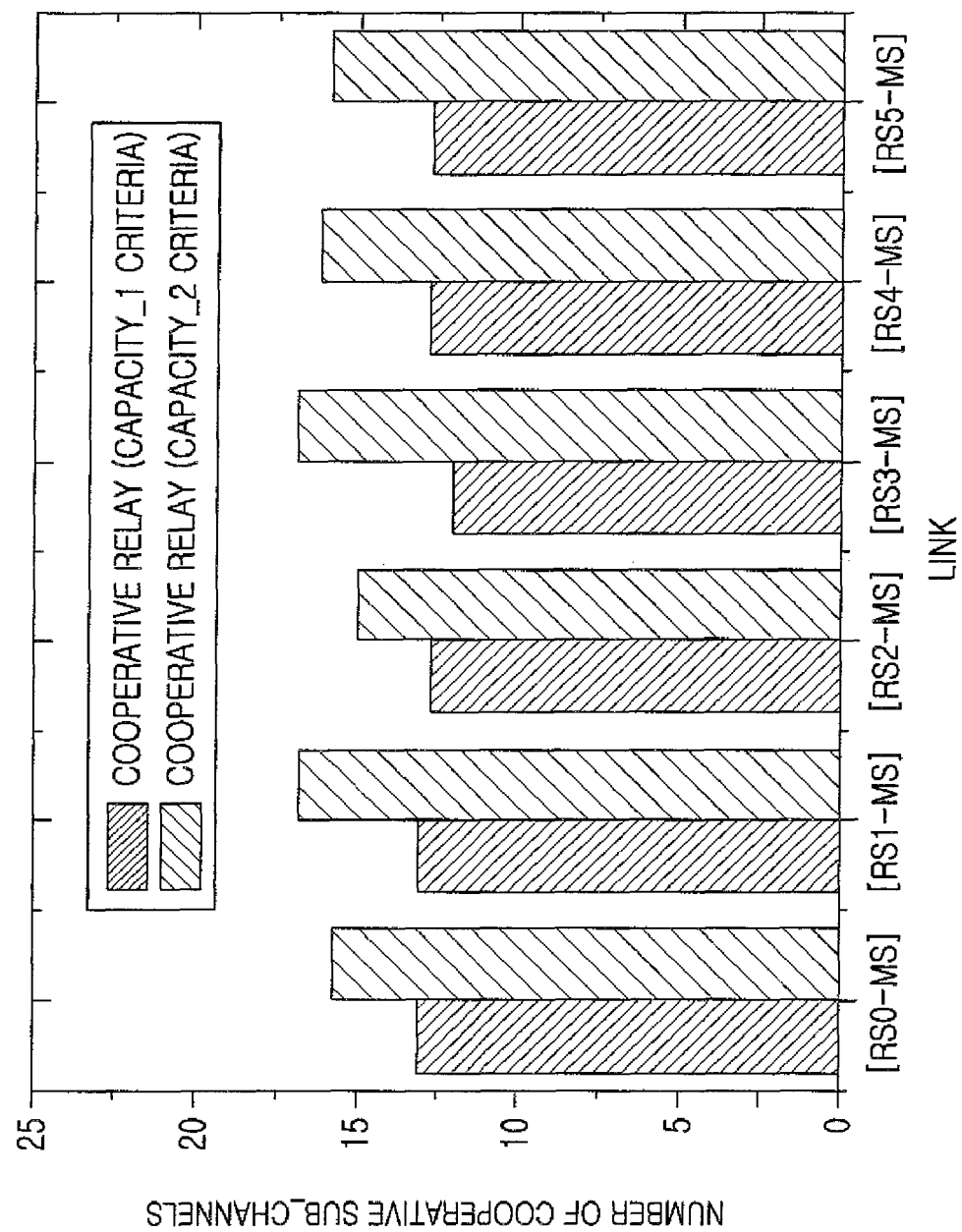
FIG. 14 illustrates the number of subchannels when a relay mode is selected based on the channel capacity according to an exemplary embodiment of the present invention.

FIG. 14 illustrates the number of subchannels when a relay mode is selectively performed based on the channel capacity according to an exemplary embodiment of the present invention. The horizontal axis indicates links between the RSs and the MS, and the vertical axis indicates the number of cooperative relay subchannels.

In particular, FIG. 14 depicts the probability of selecting the cooperative relay mode according to the cooperative relay random variable when the wireless communication system selects the relay mode based on the channel capacity.

When the wireless communication system employs the second channel capacity criteria, the number of the subchannels used for the cooperative relay is greater than the first channel capacity criteria. In other words, the lower the cooperative relay random variable in the wireless communication system, the higher the probability of selecting the cooperative relay mode.

As set forth above, the multihop relay wireless communication system supports a relay service by selecting a relay mode based on a channel capacity of a receiving terminal, a channel variation, or an AMC level. Therefore, system throughput and outage performance can be enhanced by using the adequate relay mode based on the MS distribution or the channel condition.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting one of a plurality of relay modes in a wireless communication system, the method comprising:
   checking a channel state between a Mobile Station (MS) and each of at least one Relay Station (RS);
   selecting the relay mode for supporting a relay service using the determined channel state between the MS and each of the at least one RS;
   generating a resource allocation message comprising the selected relay mode information;
   transmitting the resource allocation message to the MS and at least one RS which is to be used to provide the relay service; and
   providing the relay service to the MS using the selected relay mode.

2. The method of claim 1, wherein the plurality of relay modes comprise a first relay mode in which the MS receives the relay service from one RS, and a second relay mode in which the MS receives the relay service from at least two RSs.

3. The method of claim 1, wherein the checking of the channel state comprises:
   acquiring from the MS at least one of a Received Signal Strength Indicator (RSSI) and a Carrier to Interference and Noise Ratio (CINR) in relation with the each of the at least one RS;
   estimating an amount of interference and a signal strength using the RSSI and the CINR; and
   estimating CINRs of at least two of the plurality of relay modes using the estimated amount of interference and the estimated signal strength.

4. The method of claim 1, wherein the selecting of the relay mode comprises:
   selecting the relay mode based on at least one of a channel capacity, a channel variation, and an Adaptive Modulation and Coding (AMC) level using the determined channel state.

5. The method of claim 4, wherein the selecting of the relay mode comprises:
   when the relay mode is selected based on the channel capacity, selecting the relay mode using a ratio of a CINR in a first relay mode in which the MS receives the relay service from one RS, to a CINR in a second relay mode in which the MS receives the relay service from at least two RSs.

6. The method of claim 4, wherein the selecting of the relay mode comprises:
when the relay mode is selected based on the channel variation, selecting the relay mode based on a criteria calculated using at least one of a CINR in a first relay mode in which the MS receives the relay service from one RS, a CINR in a second relay mode in which the MS receives the relay service from at least two RSs, a coefficient according to multipath attenuation and fading in the first relay mode, and a coefficient according to multipath attenuation and fading in the second relay mode.

7. The method of claim 4, wherein the selecting of the relay mode comprises:
when the relay mode is selected based on the AMC level, checking a first AMC level according to the CINR in a first relay mode in which the MS receives the relay service from one RS, and a second AMC level according to the CINR in a second relay mode in which the MS receives the relay service from at least two RSs; and selecting the relay mode based on a ratio of the first AMC level to the second AMC level.

8. A method for selecting one of a plurality of relay modes in a Base Station (BS) of a wireless communication system, the method comprising:
checking channel state information corresponding to a channel state between a Mobile Station (MS) and each of at least one Relay Station (RS);
selecting a relay mode for supporting a relay service using the channel state information;
generating a resource allocation message comprising the selected relay mode information; and
transmitting the resource allocation message to the MS and at least one RS which is to be used to provide the relay service.

9. The method of claim 8, wherein the plurality of relay modes comprise a first relay mode in which the MS receives the relay service from one RS, and a second relay mode in which the MS receives the relay service from at least two RSs.

10. The method of claim 8, wherein the checking of the channel state information comprises:
transmitting a channel state information request signal to the MS; and
if a signal is received from the MS comprising the channel state information, checking the channel state information in the received signal.

11. The method of claim 10, wherein the channel state information request signal is included in a SCAN-REQ signal.

12. The method of claim 10, wherein the checking of the channel state information comprises:
acquiring at least one of a Received Signal Strength Indicator (RSSI) and a Carrier to Interference and Noise Ratio (CINR), in relation with the each of the at least one RS, from the signal received from the MS;
estimating an amount of interference and a signal strength using the RSSI and the CINR; and
estimating CINRs of at least two of the plurality of relay modes using the estimated amount of interference and the estimated signal strength.

13. The method of claim 8, wherein the selecting of the relay mode comprises:
selecting the relay mode based on at least one of a channel capacity, a channel variation, and an Adaptive Modulation and Coding (AMC) level using the channel state information.

14. The method of claim 13, wherein the selecting of the relay mode based on the channel capacity comprises:
selecting the relay mode using a ratio of a CINR in a first relay mode in which the MS receives the relay service from one RS, to a CINR in a second relay mode in which the MS receives the relay service from at least two RSs.

15. The method of claim 13, wherein the selecting of the relay mode comprises:
when the relay mode is selected based on the channel variation, selecting the relay mode based on a criteria calculated using at least one of a CINR in a first relay mode in which the MS receives the relay service from one RS, a CINR in a second relay mode in which the MS receives the relay service from at least two RSs, a coefficient according to multipath attenuation and fading in the first relay mode, and a coefficient according to multipath attenuation and fading in the second relay mode.

16. The method of claim 13, wherein the selecting of the relay mode comprises:
when the relay mode is selected based on the AMC level, checking a first AMC level according to the CINR in a first relay mode in which the MS receives the relay service from one RS, and a second AMC level according to the CINR in the second relay mode in which the MS receives the relay service from at least two RSs; and selecting the relay mode based on a ratio of the first AMC level to the second AMC level.

17. A Base Station (BS) in a wireless communication system, comprising:
a receiver for receiving signals from Relay Stations (RSs) and Mobile Stations (MSs);
a channel state checker for checking channel state information between an MS and each of at least one RS in a signal received from the MS to which a relay service is to be provided;
a relay mode determiner for selecting a relay mode using the channel state information;
a message generator for generating a resource allocation message comprising the selected relay mode information; and
a transmitter for transmitting the selected relay mode to the MS and at least one RS which is to be used to provide the relay service.

18. The BS of claim 17, wherein the plurality of relay modes comprise a first relay mode in which the MS receives the relay service from one RS, and a second relay mode in which the MS receives the relay service from at least two RSs.

19. The BS of claim 17, wherein the channel state checker comprises:
a message processor for checking at least one of a Received Signal Strength Indicator (RSSI) and a Carrier to Interference and Noise Ratio (CINR) between the MS and each of at least one RS from the received signal;
an interference and signal strength estimator for estimating an amount of interference and a signal strength using the RSSI and the CINR; and
a CINR estimator for estimating CINRs of at least two of the plurality of relay modes using the estimated amount of interference and the estimated signal strength.

20. The BS of claim 17, wherein the relay mode determiner selects the relay mode based on a channel state of at least one of a channel capacity, a channel variation, and an Adaptive Modulation and Coding (AMC) level.

21. The BS of claim 20, wherein the relay mode determiner, when the relay mode is selected based on the channel capacity, selects the relay mode using a ratio of a CINR in a first relay mode in which the MS receives the relay service from one RS, to a CINR in a second relay mode in which the MS receives the relay service from at least two RSs.

22. The BS of claim 20, wherein the relay mode determiner, when the relay mode is selected based on the channel variation, selects the relay mode based on a criteria calculated using at least one of a CINR in a first relay mode in which the MS receives the relay service from one RS, a CINR in a second relay mode in which the MS receives the relay service from at least two RSs, a coefficient according to multipath attenuation and fading in the first relay mode, and a coefficient according to multipath attenuation and fading in the second relay mode.

23. The BS of claim 20, wherein the relay mode determiner, when the relay mode is selected based on the AMC level, checks a first AMC level according to the CINR in a first relay mode in which the MS receives the relay service from one RS, and a second AMC level according to the CINR in a second relay mode in which the MS receives the relay service from at least two RSs, and selects the relay mode based on a ratio of the first AMC level to the second AMC level.

* * * * *